US 8,610,745 B2

(12) United States Patent
Shoji et al.

(10) Patent No.: US 8,610,745 B2
(45) Date of Patent: Dec. 17, 2013

(54) IMAGE FORMING APPARATUS AND DISPLAY CONSOLE DISPLAYING PREVIEW IMAGE

(75) Inventors: Toshihiro Shoji, Osaka (JP); Makoto Okumura, Osaka (JP); Daisuke Nago, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 270 days.

(21) Appl. No.: 13/108,563

(22) Filed: May 16, 2011

(65) Prior Publication Data

US 2011/0279363 A1 Nov. 17, 2011

(30) Foreign Application Priority Data

May 17, 2010 (JP) ................. 2010-112731

(51) Int. Cl.
*G09G 5/02* (2006.01)
*G09G 5/00* (2006.01)
(52) U.S. Cl.
USPC .......................................... 345/661; 345/156
(58) Field of Classification Search
USPC ....................................................... 715/700
See application file for complete search history.

(56) References Cited

U.S. PATENT DOCUMENTS

| 6,421,509 B1 | 7/2002 | Nomura et al. |
| 2005/0200611 A1 | 9/2005 | Goto et al. |
| 2006/0143574 A1 | 6/2006 | Ito et al. |
| 2006/0253776 A1 | 11/2006 | Ohkawa |
| 2008/0278770 A1 | 11/2008 | Sakuramata et al. |
| 2009/0066730 A1* | 3/2009 | Mikawa .......................... 345/661 |
| 2009/0096810 A1* | 4/2009 | Green ............................ 345/620 |
| 2010/0027058 A1* | 2/2010 | Okada .......................... 358/1.15 |

FOREIGN PATENT DOCUMENTS

| CN | 101482787 A | 7/2009 |
| JP | 2001-154773 A | 6/2001 |
| JP | 2006-293763 A | 10/2006 |
| JP | 2008-203439 A | 9/2008 |
| JP | 2009-237701 A | 10/2009 |

* cited by examiner

*Primary Examiner* — Joseph Haley
*Assistant Examiner* — Carl Adams
(74) *Attorney, Agent, or Firm* — Birch, Stewart, Kolasch & Birch, LLP

(57) ABSTRACT

In order to provide a technique allowing easy confirmation of image contents even if the number of images increases, a display console includes a display device having an image displaying function and a display control unit controlling the display by dividing a display screen of the display device into an image preview area and another area. The display control unit switches, in accordance with a user instruction, between a fit-to-screen screen image in which area ratio between the preview area and another area has a first value, and a finish preview screen image, an image edition mode screen image, or a document display mode screen image, in which the size of another area is made smaller and the size of preview area is made larger than in the fit-to-screen screen image.

4 Claims, 12 Drawing Sheets

IMAGE FORMING APPARATUS AND DISPLAY CONSOLE DISPLAYING PREVIEW IMAGE

CROSS-REFERENCE TO RELATED APPLICATION

This nonprovisional application claims priority under 35 U.S.C. §119(a) on Patent Application No. 2010-112731 filed in Japan on May 17, 2010, the entire contents of which are hereby incorporated by reference.

BACKGROUND OF THE INVENTION

1. Field of the Invention

The present invention relates to an image forming apparatus having an operational mode of reading and processing an image. Specifically, the present invention relates to an image forming apparatus allowing a user to confirm a state of the image and to edit the image by displaying a preview image, as well as to a display console usable in such an image forming apparatus.

2. Description of the Background Art

As one type of image processing apparatuses as electronic equipment, image forming apparatuses (typically, copy machines) are introduced to many places of business (companies and offices). A main function of an image forming apparatus is to form an image on a sheet of recording paper. Therefore, it is often the case that the image forming apparatus has a printer function, a copy function and the like. The image forming apparatus are often connected to a network, to allow use by a plurality of users. A multifunction peripheral (MFP) has been known as one type of such image forming apparatuses. An MFP has a scanner function, and has a plurality of basic operational modes such as a copy mode, a facsimile mode (hereinafter "facsimile" may also be denoted as FAX or fax), and a network-supported printer mode. It is expected that the scanner function will be used more frequently in the future in such image forming apparatuses. In the copy mode and facsimile mode also, it is possible to read an image using the scanner function and to set functions such as duplex (two-sided) printing, collective printing (such as 2-in-1 by which two pages of an original document are printed on one sheet, or 4-in-1 by which four pages of an original document are printed on one sheet), and enlargement or reduction of size.

When using such an image forming apparatus, by way of example, the user makes the following operations. First, the user has image data read by the image forming apparatus in the scanner mode. Thereafter, the user inputs various instructions through an operation panel, and performs image processing (such as collection). Then, the user gives an instruction to start a final processing of the image (printing to a sheet of paper, transmission by facsimile, and saving as a file). A screen image allowing setting of functions in various operational modes, for example, is displayed on the operation panel. Therefore, it is possible for the user to easily set various functions. While a job is being executed, job progress status is displayed on the operation panel. Therefore, it is possible for the user to easily grasp the progress status of the job. It is possible to avoid user's irritation caused when the job progress status cannot be known.

Recently, a touch-panel display comes to be increasingly used as such an operation panel. A touch-panel display includes a liquid crystal panel (display panel) and a touch-panel stacked on the liquid crystal panel. Typically, items (software buttons) allowing selection of an operational mode of the image forming apparatus are displayed on the touch-panel display. Viewing the display, the user presses a position where a desired item is displayed, on the touch-panel display. For the user, it seems as if he/she has pressed a software button. Information related to which position has been pressed is transmitted to a computer controlling the image forming apparatus, and what operation is to be carried out is determined in accordance with the position, by a program running on the computer.

The touch-panel display provides both the display function and the operation function. The touch-panel display is advantageous in that it occupies a smaller area for installation than a display unit and an operation unit provided separately, it allows various and many manners of display, and it provides various and many functions. Recently, a function of recognizing a trace of a user's finger in contact with and moved over the surface of touch-panel display has been realized. Because of this function, if the user moves his/her finger on the touch-panel display, an appropriate instruction intuitively matching the movement can be given. In the present specification, operation of an electronic device through such an operation will be referred to as "gesture operation." The gesture operation includes the following.

Assume that a preview of an image read by the scanning function is displayed on the touch-panel display. At this time, for example, the following operations are possible.

(1) The user may lightly taps twice a position where an image is displayed. Such an operation will be hereinafter referred to as double-tapping. When an image is double-tapped, the image display may be enlarged or reduced, or a transition is made to a mode allowing edition of the image.

(2) The user may move his/her two fingers to expand a space between the fingers. Such an operation will be hereinafter referred to as pinch-out or pinch-open. If the user pinches-out or pinches-open an image, the image may be displayed in enlargement, corresponding to the movement of the fingers.

(3) The user may move his/her two fingers to make smaller a space between the fingers. Such an operation will be hereinafter referred to as pinch-in or pinch-close. If the user pinches-in or pinches-close an image, the image may be displayed in reduced size, corresponding to the movement of the fingers.

Other examples of the gesture operations may include: tapping, or lightly touching a position where an image is displayed; dragging, or sliding a displayed image with a finger; flicking, or lightly sweeping a displayed image to scroll; and pinching a displayed image with two fingers. It is noted that the tapping and double-tapping do not involve detection of the user operation trajectory on the touch-panel display and, hence, strictly speaking, these may not be gestures. Here, however, the above-described operations including tapping and double-tapping will be generally referred to as gesture operations.

In the present specification, any operation on the touch-panel display other than the gesture operations described above will be referred to as a touch operation. The touch operation refers to an operation for realizing a function in place of a hardware key, and not a direct operation on the image. Typically, it refers to an operation of detecting a user request based on the display position of software buttons (generally, user interface components) displayed on the touch-panel display and the position of user operation on the touch-panel display.

An MFP having such a touch-panel display as the operation panel allows various finish processes on the image. The finish processes include settings related to various image processing operations including margin size, stamping, stapling or punching. With such a finish process or processes set, however, sometimes the actual printing fails. For example, it is not unusual that a user sets a finish with punched holes and when actually printed, the output is a failed copy having images overlapped with the positions of holes to be punched. This leads to waste of consumables (toner and recording paper).

In order to solve such a problem, Japanese Patent Laying-Open No. 2008-203439 (herein after referred to as '439 Reference) discloses an image forming apparatus providing an image preview on a basic screen image of a copy operational mode.

In the image forming apparatus, the screen image is roughly divided into three. On opposite side areas, software buttons for setting conditions at the time of image formation and setting conditions for finish are arranged. At the center, a preview image of a document is arranged. There are a plurality of different manners of displaying the preview image. In the first manner, a prescribed number (5) of images are arranged in landscape orientation. Here, the image positioned at the center is displayed in a larger size than other images. In the second manner, odd-numbered pages and even-numbered pages are displayed in two-page spread. If the number of pages is large, the spread pages are displayed stacked like a book. In the third manner, a plurality of document images are displayed arranged in a matrix. If the document images are too large in number to be displayed on a screen image, the screen image is scrolled to allow viewing of all pages.

As described in '439 Reference, by effectively utilizing the preview, it is possible to confirm the finish state of the document, and to reduce failure of copying. The image forming apparatus, however, still has a problem. By way of example, assume that previews of a plurality of pages are to be displayed. When a certain page among the images of the plurality of pages is to be moved to another page, a series of pages including these pages must be displayed on the preview area. If the number of pages to be displayed increases, it becomes difficult to confirm the contents of each image, and possibility of moving the image to an erroneous position becomes higher. Further, if the number of images to be displayed increases, the reduction ratio of preview image becomes higher, so that it becomes difficult to confirm the contents of each image and to confirm the finish of the copy.

SUMMARY OF THE INVENTION

An object of the present invention is to provide a technique that enables easy confirmation of image contents even when the number of images increases.

According to an aspect, the present invention provides a display console, including: a display device having an image displaying function; and a dividing unit for controlling the display device to divide a display screen of the display device into an image preview area and another area. The dividing unit includes a switching unit switching, in accordance with a user instruction, between a first display mode in which area ratio between the preview area and the another area has a first value and a second display mode in which size of the another area is made smaller and size of the preview area is made larger than in the first display mode.

In the second display mode, the preview area is enlarged. Even if the number of images to be previewed increases, it is unnecessary in the second display mode to make higher the reduction ratio of the images. As a result, a display device by which contents of images can easily be confirmed even when the number of images increases can be provided.

Preferably, both in the first display mode and the second display mode, the another area is not erased from the display screen. The dividing unit further includes an arranging unit arranging, in the second display mode, the another area at such a position where the center of the another area is included in the area where it is displayed in the first display mode.

The another area is not erased, and the position is not much changed in the first and second display modes. The user can recognize that the area exists there. It is possible to prevent user's confusion when operation is to be made using elements arranged on such an area.

The dividing unit may further include an arranging unit arranging the preview area at a position including the center of the display screen. The size of another area may be smaller than the size of preview area in the first display mode.

The preview area is positioned at the center of the display screen. It is easy to secure sufficient size of the preview area, and it is easy for the user to confirm the preview image.

The another area includes a task trigger area in which an element instructing execution of a prescribed task on document data having its preview image displayed is arranged, and a function selecting area in which an element for selecting a function of setting one or both of data conversion and condition for executing the task, on the document data having its preview image displayed, is arranged. The dividing unit further includes a first reducing unit displaying, in accordance with a user instruction, at least the function selecting area in reduced size in the second display mode.

For the image displayed as a preview, it is possible to set conditions when data conversion or execution of a prescribed task is performed, using elements arranged on the function selecting area. It is possible to execute the prescribed task on the document data thereafter, using elements arranged on the task trigger area. Since the function selecting area is displayed reduced in size, the preview area is enlarged. The effect attained by function selection can easily be confirmed by the preview display. If the task trigger area is left, execution of a task can be instructed immediately after confirming the effect, so that smooth operation becomes possible.

More preferably, in the display console, the first reducing unit displays both the function selecting area and the task trigger area in reduced size, in the second display mode. The function selecting area and the task trigger area may be displayed on opposite sides of the preview area.

In the second display mode, both the function selecting area and the task trigger area are displayed in reduced size. The display screen can be fully utilized as the preview area. The flow of operations including setting of functions and conditions using the function selecting area, confirmation of preview image, and execution of a task matches the arrangement of areas. As a result, smooth user operation becomes possible.

More preferably, the dividing unit further includes a changing unit changing the function selecting area between a size in the first display mode and a size in the second display mode in accordance with a user operation for changing the size of the function selecting area, in addition to the user operation of switching the first display mode and the second display mode.

After confirming the preview image with the preview area enlarged, a desired function can be selected on the function setting area, without changing the display mode. Therefore, it is possible for the user to confirm and process images by simple operations.

In the display console, the changing unit includes a unit for displaying, if a user instruction to set the size of the function selecting area to the size in the first display mode is issued in the second display mode, the function selecting area larger than the size in the second display mode with background of the area made translucent.

Even when the function setting area is displayed in a small size, the function setting area can be enlarged by a user operation without changing the display mode. Further, it is possible to easily confirm the preview image of the enlarged portion. It is possible for the user to easily set a function or functions while he/she is aware of the state of preview image.

The dividing unit may further include an icon display unit for displaying functions of the function selecting area with icons, in the second display mode.

It is possible to have the user recognize the functions of various elements arranged on the function setting area by the icon display, while the preview area can be increased. Confirmation of even fine details of the preview image becomes possible and, at the same time, easy selection of a function becomes possible.

The another area may further include an action panel area displaying, while an image preview is displayed, an operation hint selected in accordance with a function selected by the user.

By the action panel, operation hints related to user operations on the image of which preview is displayed are given. By way of example, functions not known to the user may be suggested to the user. Therefore, the electronic equipment provided with the display device can effectively be utilized.

The dividing unit may further include an enlarging/reducing unit for enlarging or reducing the action panel area in accordance with a user instruction and thereby enlarging or reducing the size of the preview area.

The size of action panel area changes in accordance with a user instruction. If operation hints are unnecessary for the user, it is possible to enlarge the preview area. If necessary, the action panel is enlarged, so that the operation hints can easily be recognized. As a result, confirmation of preview image and effective use of device functions can both be attained.

Preferably, the second display mode is a finish preview display mode allowing confirmation of finish state of the document when the prescribed process is executed under the condition set using a function displayed on the function selecting area. The first reducing unit displays only the function selecting area in reduced size in the preview display mode.

Since the task trigger area is displayed, it is possible to immediately execute a prescribed task by the decision of the user. As compared with a case where the task trigger area is reduced, the necessary number of user actions can be reduced by one, and hence, the operation can be simplified.

A touch-panel may be provided stacked on the display screen. The display console may further include a controller connected to receive an output of the touch panel, for executing control of display by the dividing unit and output of an instruction to other units and devices, by comparing information displayed on the function selecting area and the task trigger area with the output of the touch-panel.

Since the touch-panel is provided stacked on the display screen, it is possible to intuitively operate the function selecting area and the task trigger area.

More preferably, the second display mode is an image edition mode allowing an operation of editing an image displayed on the preview area. The another area includes a task trigger area in which an element for instructing execution of a prescribed task on the document data having its preview image displayed on the preview area is arranged. The dividing unit further includes a second reducing unit for displaying the task trigger area in reduced size in the image edition mode.

In the image edition mode, the task is not immediately executed but the preview display must be confirmed once. Therefore, it is unnecessary to have the task trigger area displayed in the normal size. On the other hand, the user is always aware as to where the elements to start a task are displayed, since the task trigger area is simply reduced in size. Therefore, possibility of confusing operations is low when the execution of a task is actually started.

According to another aspect, the present invention provides an image forming apparatus having a housing. The image forming apparatus includes: an operation panel attached on the housing; a storage unit provided in the housing, for storing document data; and an image forming unit provided in the housing, for forming an image of document data stored in the storage unit on recording paper, in accordance with an instruction received through the operation panel. The operation panel includes a display device having an image displaying function, and a dividing unit for controlling the display device to divide a display screen of the display device into an image preview area and another area. The dividing unit includes a switching unit switching, in accordance with a user instruction, between a first display mode in which area ratio between the preview area and the another area has a first value and a second display mode in which size of the another area is made smaller and size of the preview area is made larger than in the first display mode.

According to the present invention, in the second display mode, the preview area is enlarged. Even if the number of images to be previewed increases, it is unnecessary to increase the image reduction ratio in the second display mode. Therefore, details of the image can be confirmed. As a result, the preview information and function setting information desired by the use can accurately be transmitted to the user.

The foregoing and other objects, features, aspects and advantages of the present invention will become more apparent from the following detailed description of the present invention when taken in conjunction with the accompanying drawings.

DETAILED DESCRIPTION OF THE EMBODIMENTS

Figure 1:
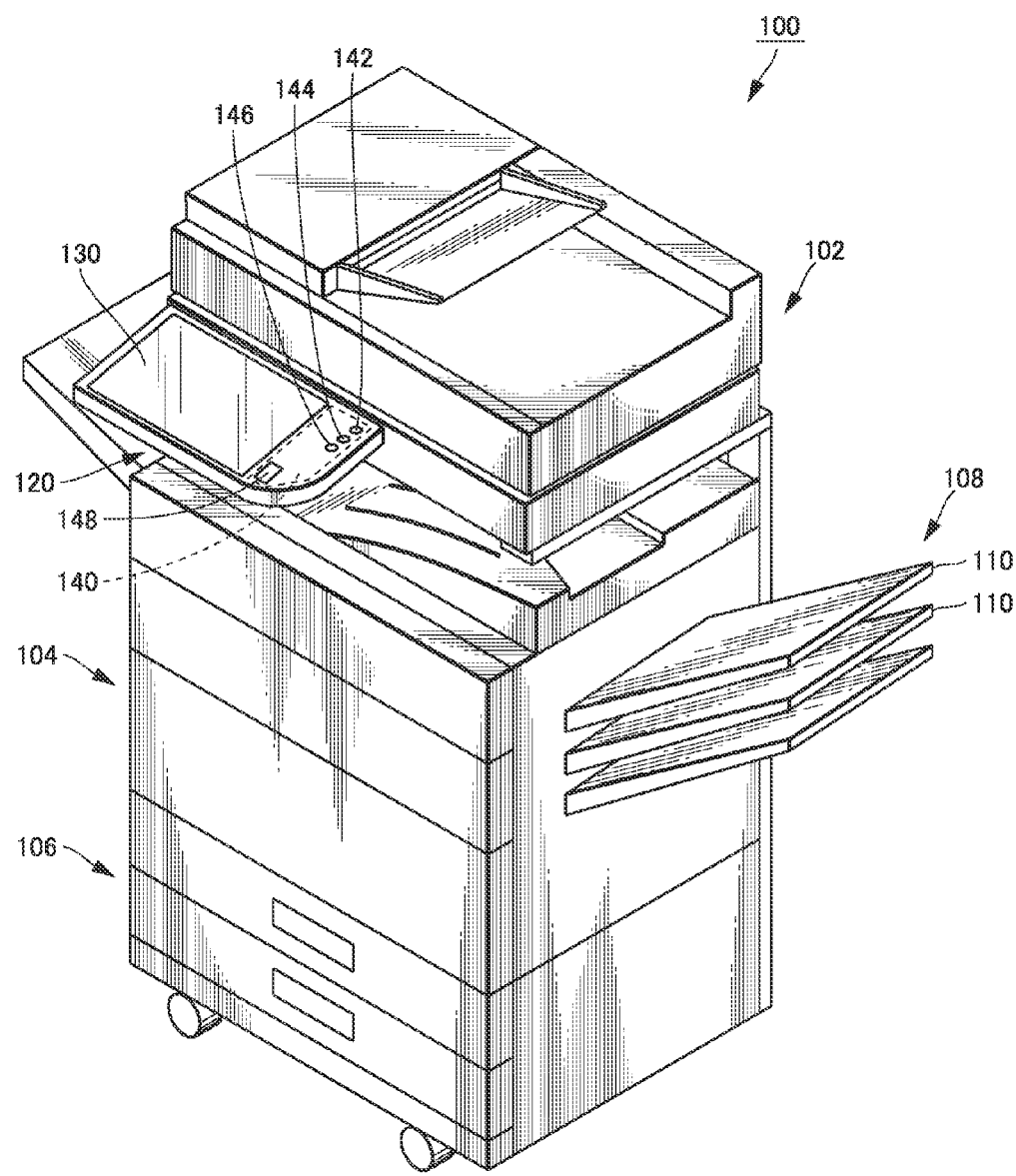
FIG. 1 is a perspective view showing an appearance of the image forming apparatus in accordance with an embodiment of the present invention.

In the following description, the same components are denoted by the same reference characters. Their names and functions are also the same. Therefore, detailed description thereof will not be repeated.

The electronic device in accordance with an embodiment of the present invention is an image forming apparatus as one type of image processing apparatuses. Application of the present invention, however, is not limited to an image forming apparatus. The present invention may be applied to other apparatuses, such as an image processing apparatus or arbitrary electronic equipment that uses a screen image.

An image forming apparatus 100 (see FIG. 1) as will be described in the following has a touch-panel display (hereinafter simply referred to as a "touch-panel"). An operation of tracing a surface of the touch-panel is "gesture." Various gesture operations are defined in accordance with various traces drawn by a fingertip. When a user operates image forming apparatus 100, he/she may use both the gesture operation method and a touch operation method not involving the gesture operation.

Image forming apparatus 100 forms an image on a sheet of recording paper by electro-photography. Image forming apparatus 100 includes, as operational modes, copy mode, FAX mode, document filing mode (a mode in which a scanned image is stored in a storage device in the image forming apparatus) and mail mode (a mode in which a scanned image is transmitted attached to an electronic mail). The image forming apparatus 100 may further include network printer mode. The present invention is not limited to the above, and it may be any image forming apparatus including at least one of the four operational modes, that is, copy mode, FAX mode, document filing mode and mail mode, in which a function selection menu and preview information are displayed on the touch-panel in at least one operational mode. The printing method is not limited to electro-photography.

[Configuration]

Figure 2:
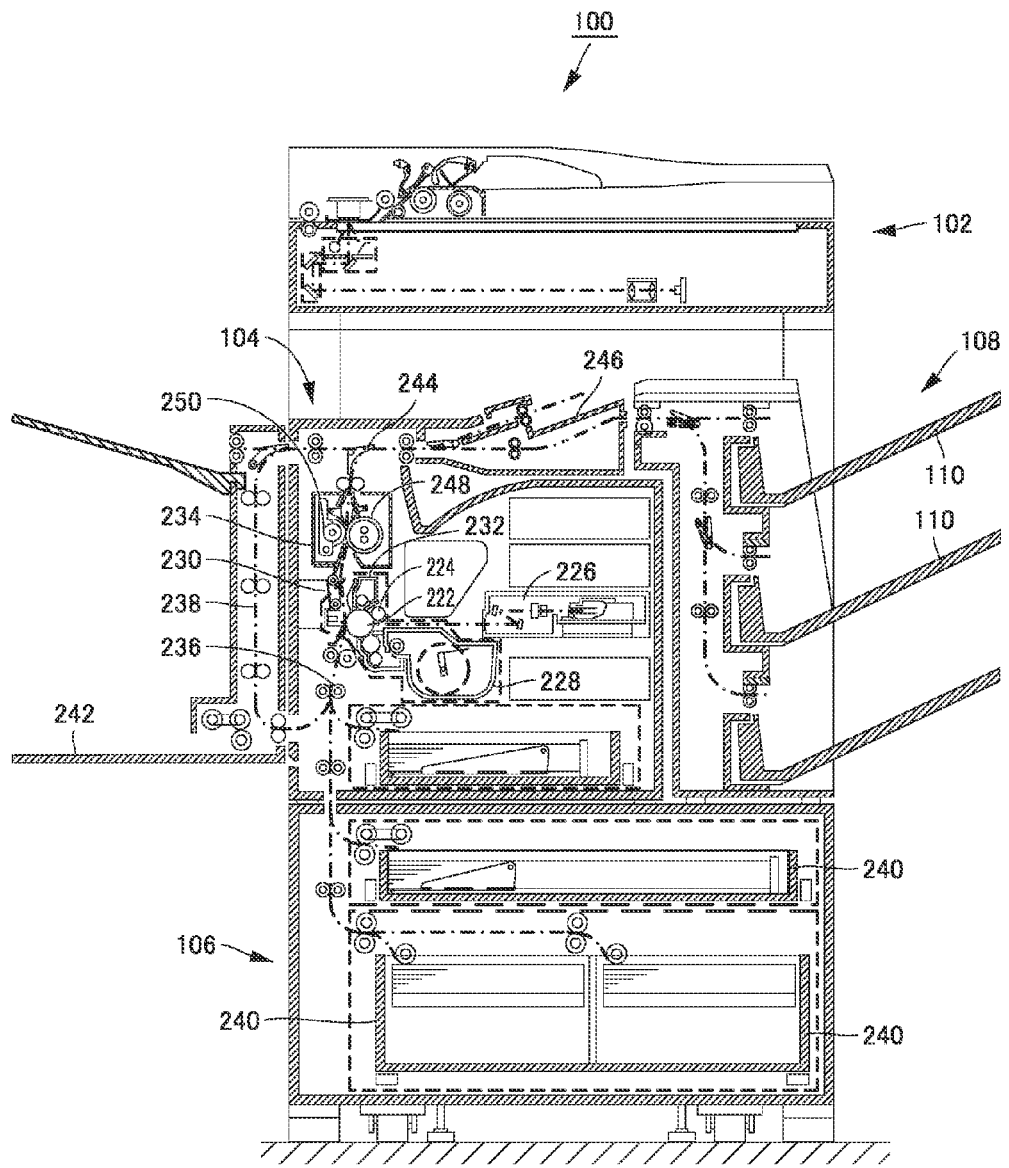
FIG. 2 schematically shows an internal configuration of the image forming apparatus shown in FIG. 1.
Figure 3:
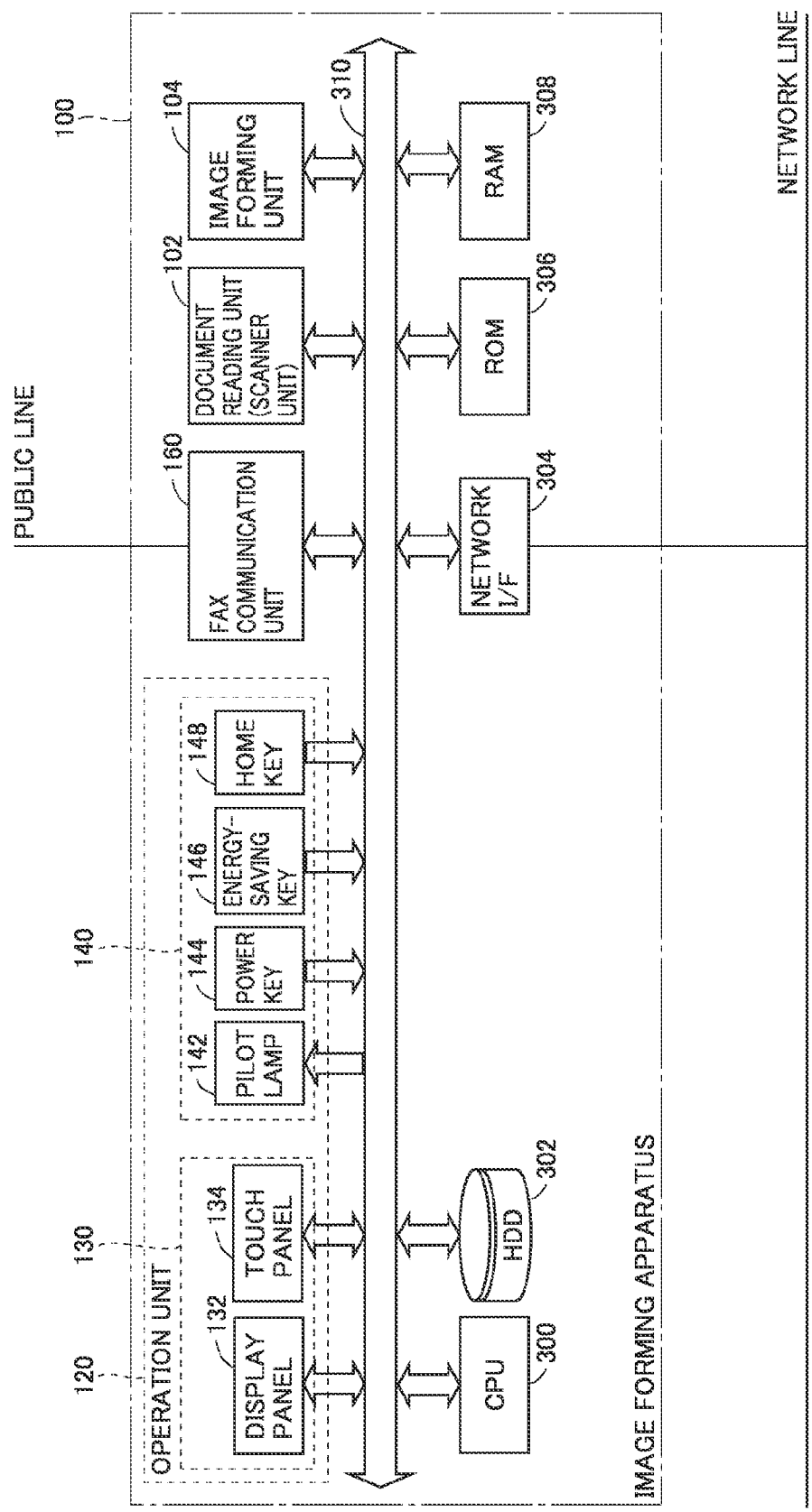
FIG. 3 is a block diagram showing a hardware configuration of the image forming apparatus shown in FIG. 1.

Referring to FIGS. 1 to 3, an image forming apparatus 100 in accordance with the present embodiment will be described.

Referring to FIGS. 1 to 3, image forming apparatus 100 includes a document reading unit 102, an image forming unit 104, a paper feed unit 106, a paper discharge unit 108 and an operation unit 120. Operation unit 120 includes a touch-panel display 130 (hereinafter simply referred to as "display 130") and a display operation unit 140. Display 130 includes a display panel 132 formed of a liquid crystal panel or the like, and a touch-panel 134 arranged on display panel 132. Touch-panel 134 allows detection of a trajectory of the user's finger moved in contact with the surface. Display operation unit 140 includes a pilot lamp 142, a power key 144, an energy-saving key 146, and a home key 148 for returning the display screen image on display 130 to a home screen image. The home screen image is a screen image allowing the user to select various operational modes, as will be described later.

As described above, image forming apparatus 100 in accordance with the present embodiment is provided with display 130 as a main operation device, and, in addition, with display operation unit 140 including hardware keys and a pilot lamp. The keys (power key 144, energy-saving key 146 and home key 148) of display operation unit 140 are hardware buttons, different from the software buttons realized by display 130.

The present embodiment is characterized in the screen image providing a preview display of a scanned image. The preview display is given in any of the copy mode, mail mode, FAX mode and document filing mode. In any of these modes, the function of image forming apparatus 100 related to the preview display is essentially the same. Therefore, in the following description, schematic configuration of image forming apparatus 100 will be described mainly with reference to the copy mode as an example.

In the copy mode, mainly document reading unit 102 and image forming unit 104 operate.

In image forming apparatus 100, a document placed on a platen is read by document reading unit 102 as image data. The image data is subjected to various image processing operations, and the resulting image data is output to image forming unit 104.

Image forming unit 104 is for printing an image of the document represented by the image data on a recording medium (in most cases, on a sheet of recording paper). Image forming unit 104 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 104, a main feeding path 236 and a reverse feeding path 238 are provided, and a sheet of recording paper fed from paper feed unit 106 is fed along main feeding path 236. Paper feed unit 106 draws out sheets of recording paper stacked on a paper feed cassette 240 or on a manual feed tray 242 one by one, and feeds the sheet of paper to main feeding path 236 of image forming unit 104.

While the sheet of recording paper is fed along main feeding path 236 of image forming unit 104, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing. When operational mode is changed to the energy saving mode, power supply to the heater is, for example, stopped or reduced.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 108.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 108.

The sheet of recording paper printed in the above-described manner is guided to paper discharge tray 246 or to paper discharge unit 108, and discharged to paper discharge tray 246 or to any of paper discharge trays 110 of paper discharge unit 108.

Paper discharge unit 108 may perform a process of sorting a plurality of printed sheets of paper to be output to different discharge trays 110, a process of punching each sheet of recording paper or a process of stapling the sheets of recording paper. Assume that a number of copies of the printing are to be prepared. In that case, sheets of recording paper are sorted and discharged to paper discharge trays 110 such that each tray 110 contains each set of printed sheets, and the set of printed sheets in each tray 110 is stapled or punched.

Referring to FIG. 3, image forming apparatus 100 further includes: operation unit 120 allowing setting of functions related to the copy mode, facsimile mode, document filing mode and mail mode; ROM (Read Only Memory) 306 for storing programs and the like; a hard disk drive (hereinafter denoted as HDD) 302 as a non-volatile storage area capable of storing programs and data even when power is cut off; and an RAM (Random Access Memory) 308 providing a storage area when a program is executed.

Image forming apparatus 100 further includes a bus 310 connected to document reading unit 102, image forming unit 104, FAX communication unit 160, operation unit 120, ROM 306, HDD 302, and RAM 308, and CPU (Central Processing Unit) 300 connected to bus 310, realizing general functions as the image forming apparatus.

HDD 302 stores files of image data of documents scanned by image forming apparatus 100, folder by folder, together with date and time of saving and name of the user who saved.

ROM 306 stores programs and data necessary for controlling operations of image forming apparatus 100. CPU 300 controls image forming apparatus 100 in accordance with the programs and data stored in ROM 306, and executes control related to various functions of image forming apparatus 100.

As shown in FIG. 3, a public line is connected for transmitting/receiving image data, to FAX communication unit 160. To network interface 304, a network line is connected. To the network line, a computer or the like using image forming apparatus 100 as a network-supported printer may be connected, or a computer or the like identified by a URL (Uniform Resource Locator) designated through the Internet may be connected. When connected to the Internet, image forming apparatus 100 can obtain necessary information through the Internet.

RAM 308 provides a function of a working memory for temporarily storing results of operations and processes by CPU 300, and a function of a frame memory for storing image data.

CPU 300 controls document reading unit 102, image forming unit 104, display 130 and display operation unit 140 forming operation unit 120, ROM 306, HDD 302 and RAM 308 by executing a prescribed program or programs. Operation unit 120 communicates with CPU 300 through an input/output interface.

Operation unit 120 is formed of a plate-shaped panel provided in an inclined manner to be easily viewable by the user. On a surface of operation unit 120, display 130 is provided on the left side area, and display operation unit 140 (pilot lamp 142 and power key 144, energy-saving key 146 and home key 148 as hardware buttons) is provided on the right side area. Display 130 and display operation unit 140 form operation unit 120 as one integrated body as a whole.

As described above, display 130 is formed of display panel 132 and touch-panel 134 arranged on display panel 132. On display panel 132 of display 130, a home screen image allowing selection of an operational mode of image forming apparatus 100, current state of image forming apparatus 100, status of destination designation, and status of job processing are displayed. On a display area of display panel 132, selection buttons as software buttons are displayed. When a portion where the selection button is displayed is pressed by a finger, touch-panel 134 detects the pressed position and outputs information indicating the position. By comparing the display position of the selection button and the position where the touch-panel 134 is pressed using a program, selection of an operational mode, setting of a function, and instruction of an operation of image forming apparatus 100 become possible. In addition to such a touch operation (command input operation based on the position of pressing by the user), image forming apparatus 100 also allows gesture operation (command input operation based on trajectory of operation by the user) as described above.

Pilot lamp 142 of display operation unit 140 is, for example, an LED (Light Emitting Diode). It is turned on/off (/flickered) under the control of CPU 300. When the user presses power key 144 provided separate from a main power switch, image forming apparatus 100 makes a transition from a standby mode (in which, for example, only the FAX receiving operation is possible with the main power on) to a normal mode, in which every operational mode of image forming apparatus 100 is usable. In this state, pilot lamp 142 is turned and kept on. If a predetermined time passes without any user operation, or if the user presses energy-saving key 146, image forming apparatus 100 makes a transition from the normal mode to the energy saving mode. In the energy saving mode, only some of the operational modes of image forming apparatus 100 can be used. In this state, pilot lamp 142 flickers. Further, if the user presses energy-saving key 146 in the energy saving mode, the image forming apparatus 100 makes a transition from the energy saving mode to the normal mode. Home key 148 is a hardware key for returning the display of display 130 to the initial state (home screen image).

In a hardware button (power key 144, energy-saving key 146 and home key 148) of display operation unit 140, a key lamp or key lamps, which is/are turned on/off (/flickered) under the control of CPU 300, may be embedded. By way of example, the key lamps provide a light ring on the edge of a circular key, or the key lamp lights a central portion of the key. The key lamp is turned on at a timing when hardware buttons are allowed to be used as the operation device (at a timing when a process is executed if the hardware button is used).

Image forming apparatus 100 in accordance with the present embodiment includes the four operational modes (copy mode, facsimile mode, document filing mode and mail mode) as described above. On display 130, software buttons for setting functions in respective operational modes are displayed, and buttons for setting a destination or a preview as an expected image, for example, are displayed as needed.

In image forming apparatus 100, if an operational mode is selected on the home screen image of display 130, the initial screen image of each operational mode is displayed. In the preview screen image in the copy mode, (1) the screen image is divided into five areas ("system area," "function selecting area," "preview area," "action panel area," and "task trigger area"). These are arranged appropriately and, therefore, the flow lines of the user's viewpoint and fingertip similar to those in a conventional device can be realized. (2) Functions allocated to respective ones of the five areas are common among different preview display modes. Therefore, the user may not be confused in different display modes. (3) The size of "function selecting area" is changed in accordance with the display mode. Correspondingly, the size of "preview area" is also changed. Thus, function setting information and preview information can accurately transmitted to the user. (4) The "preview area" is positioned at the center, and the "function selecting area" and the "action panel area" and "task trigger area" are arranged on opposite sides. As a result, it becomes possible to select a function on an area ("function selecting area") arranged on one side, to confirm the process attained by the selected function by the preview on the area arranged at the center, and to request execution of the function on the areas arranged on the other side ("action panel area" and "task trigger area"). Specifically, the eye movement and hand movement involved in the process are linear, enabling smooth operation.

Figure 4:
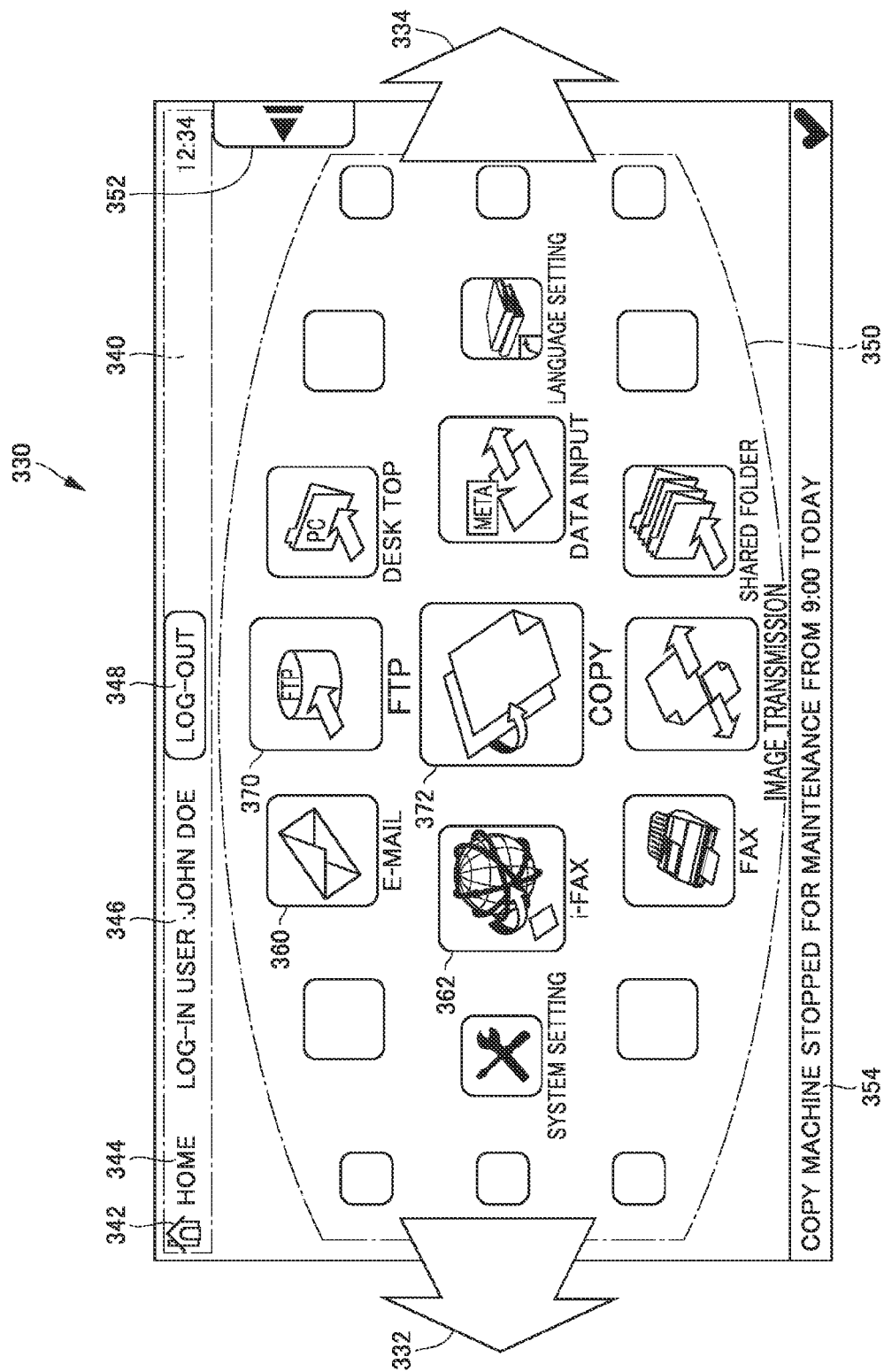
FIG. 4 shows a home screen image displayed on a touch-panel of the image forming apparatus in accordance with an embodiment of the present invention.

Referring to FIG. 4, home screen image 330 includes a home system area 340 corresponding to the system area described above, an icon display area 350, an icon display switching tub-button 352, and a memo display area 354.

On home system area 340, an area 342 displaying an icon representing the home screen image, an area 344 displaying the name of the displayed screen image, an area 346 displaying the logged-in user name, an area 348 displaying a log-out button (software button) are arranged. On the right side of home system area 340, an area displaying the current time is arranged.

On icon display area 350, icons representing operational modes are displayed together with the names or abbreviations of the operational modes. In the present embodiment, an icon 372 for selecting the copy mode, an icon 362 for selecting the FAX mode, an icon 370 for selecting the document filing mode, and an icon 360 for selecting the mail mode are displayed in icon display area 350. FIG. 4 also shows icons for selecting other processes. These icons include, for example, an icon for activating a system setting process, an icon for activating a language setting process, and an icon for displaying job status.

As shown in FIG. 4, in icon display area 350, icons are arranged in a matrix of 3 rows and 7 columns in lengthwise and widthwise directions. Icons displayed closer to the center of icon display area 350 are displayed in larger size than icons arranged at the periphery.

When the user makes a flick operation to the left with his/her finger on icon display area 350, icons displayed on the screen move as if they flow in the direction indicated by an arrow 332. When the user makes a flick operation to the right on icon display area 350, icons displayed on the screen move as if they flow in the direction indicated by an arrow 334. In the present embodiment, distance of movement of the screen image here is determined, for example, in accordance with the distance of movement and the speed of the fingertip in the flick operation. Assuming that the speed of movement of the fingertip is the same, the distance of movement of the icon becomes longer if the distance of movement is higher. Assuming that the distance of movement of the fingertip is the same, the distance of movement of the icon becomes longer if the speed of movement is higher. Initial speed of movement of the screen image should preferably be made substantially the same as the speed of movement of the fingertip. The icons on icon display area 350 are supposed to move as if these icons are arranged on a virtual cylinder. Specifically, when the screen image is repeatedly moved to the right, the same screen image comes to be displayed repeatedly as when a cylinder is rotated.

On memo display area 354, a piece of maintenance information or the like to be notified to every user of image forming apparatus 100 is displayed.

[Layout of Copy Basic Screen Image]

Figure 5:
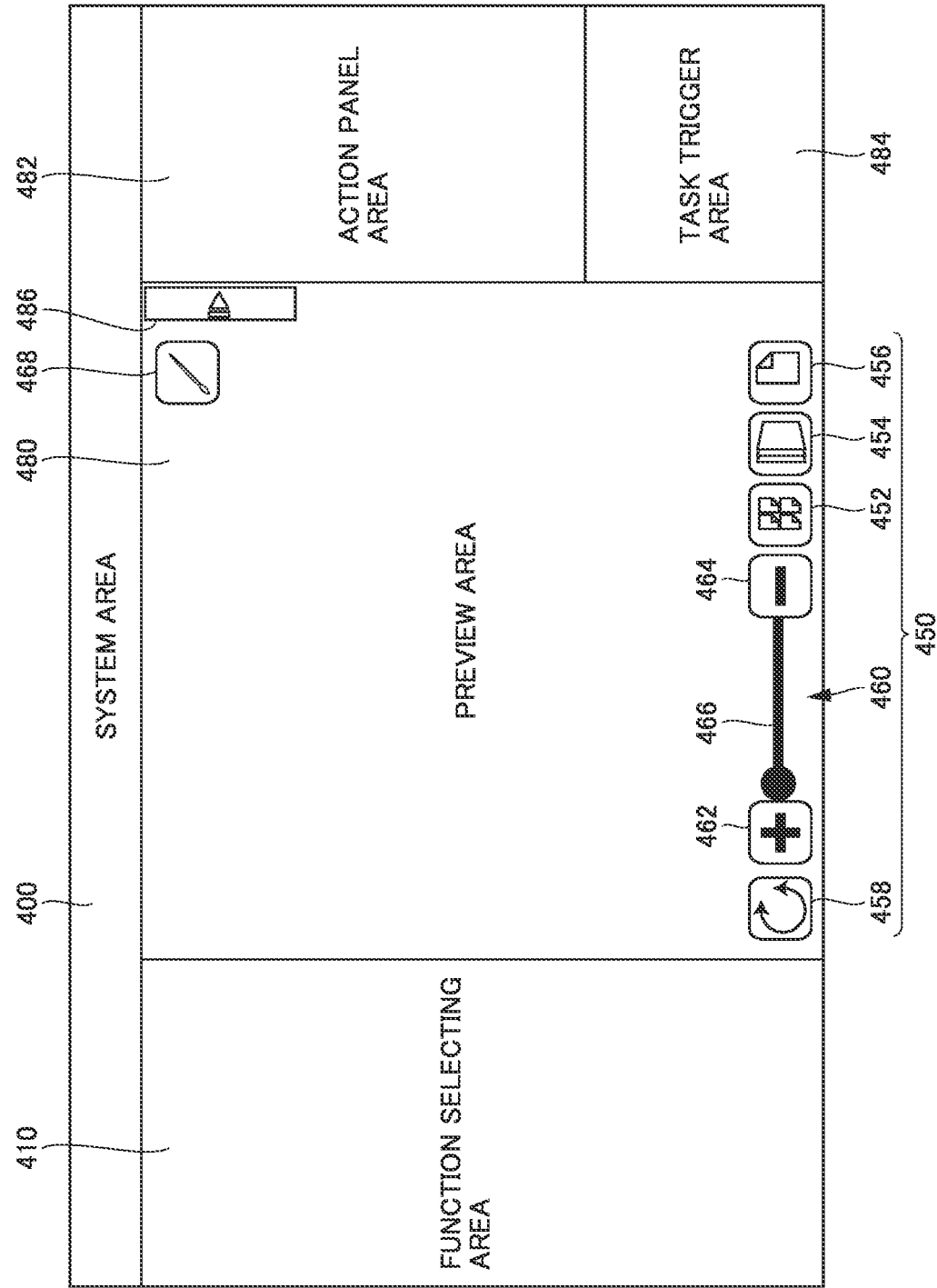
FIG. 5 shows the manner of division of touch-panel display area of the preview image, in the image forming apparatus shown in FIG. 1.

FIG. 5 shows a basic layout in the copy mode operation (referred to as a "copy basic screen image") on display 130. The copy basic screen image is first displayed when the copy mode is selected. One characteristic of the present embodiment is that, basically, preview is possible in all screen images including the copy basic screen image. Similar image preview can be selected at the time of facsimile transmission, image transmission by mail or image filing. In any of these operational modes, basic screen image configuration related to preview display is the same. Therefore, in the following, only the copy basic screen image will be described.

Referring to FIG. 5, let as consider display 130 of landscape layout (for example, width of 1024 pixels×length of 600 pixels). System area 400 is arranged at the uppermost portion, and preview area 480 is arranged at the center, of the screen image. On the left side of preview area 480, function selecting area 410 for setting a function and confirming the contents of function is arranged. On the upper right side of preview area 480, action panel area 482 is arranged. On a lower right side of preview area 480, task trigger area 484 is arranged. These areas have their sizes changed in accordance with the preview display modes, as will be described later.

On system area 400, the current state of image forming apparatus 100 is displayed and, in addition, the title of operational mode that is being operated and status/state of image forming apparatus 100 are displayed. By way of example, on system area 400, an operational mode name, an interruption key, a log-in user name, status of a currently processed job, state of use of an internal memory, time and the like are displayed.

On function selecting area 410, a function selection menu (icons, buttons, setting items screen image, and a function list screen image) to be operated by the user for setting each function, switching display and confirming setting, is displayed. These are for setting conditions of data conversion and conditions at the time of executing a task, on the image data of the document.

In preview area 480, an image of expected document output (finished form) is displayed. Every time the user designates the manner of finish, the image displayed on preview area 480 changes.

Preview area 480 includes a group of preview change buttons 450 at a lower portion, for changing display style of preview area 480. The group of preview change buttons 450 includes: a rotation button 458 for rotating the preview by a desired angle; a zoom bar 460 for enlarging/reducing the preview image; a document display mode button 452 instructing change to a document display mode, as will be described later; a finish preview button 454 instructing a change to a finish preview screen image; and a fit-to-screen button 456 instructing a change to the fit-to-screen mode. At an upper right portion of preview area 480, an image edition button 468 is arranged, for instructing a change to an image edition mode allowing edition of documents. The image edition mode will be described later.

When rotation button 458 is touch-operated, a dialog designating a rotation angle of the preview is displayed. When a desired angle is designated, the preview image displayed in the preview area is rotated by that angle. The preview may be rotated by making a gesture operation on the preview image. For instance, by placing two fingers on the preview image and turning the fingertips, the preview image rotates in the direction of finger rotation, by the angle defined by the amount of movement of the fingers.

Zoom bar 460 includes a plus button 462 instructing display of the preview image enlarged in a prescribed enlargement factor, a minus button 464 instructing display of the preview image reduced in a prescribed reduction factor, and a bar 466 for enlarging or reducing the display of preview image in an arbitrary magnification. When plus button 462 is touch-operated, or bar 466 is gesture-operated (slid) to the side of plus button 462, the preview is enlarged. When minus button 464 is touch-operated, or bar 466 is slid to the side of minus button 464, the preview image is displayed in reduced size. When the preview image is pinched-out/pinched-open, the preview is enlarged. When the preview image is pinched-in/pinched-close, the preview image is displayed in reduced size.

If the number of pages of document images to be displayed on preview area 480 is large, a page selection button (page number input button, page feed button, page return button, single page display button, plural page display button and the like) is displayed. When the document image displayed on preview area 480 is flicked, the document page can be fed forward or backward. If the document image displayed on preview area 480 is large, a scroll bar that can be touch-operated or gesture-operated is displayed.

On action panel area 482, pieces of information related to assistance, guidance and suggestion related to the operation are displayed. If, for instance, a user selects a specific function, on action panel area 482, functions related to the selected function may be displayed. Other functions related to the same object of the selected function may be displayed. Further, functions selected in the past by the user or a user of a group to which the user belongs in relation to the selected function may be displayed as "recommended functions."

On the left side of action panel area 482, an action panel reducing button 486 is displayed, which is operated by the user when action panel area 482 is to be displayed in reduced size. When action panel reducing button 486 is pressed, action panel area 482 is reduced in size and displayed in the form of buttons on the right side of the screen image, as will be described later. When the button is pressed, action panel area 482 is again displayed in the enlarged size. Specifically, the user can reduce or enlarge the action panel area 482 by pressing the button. Accordingly, the preview area 480 is enlarged or reduced. Confirmation of preview image and confirmation of operation hints can be done easily in accordance with the user's intention.

In task trigger area 484, items (software buttons) as triggers for starting certain processes of image forming apparatus 100 are displayed. These items are displayed when all settings are completed in a certain operational mode and image forming apparatus 100 is ready to operate actually. By way of example, on task trigger area 484, a scan start button (in FIG. 6 and the following, "SCAN IN" button), a monochrome copy start button (MONO START), a color copy start button (COLOR START) and a clear all button (CA) are displayed. The scan start button is a button for starting a process for once reading a document and providing a preview in copying or FAX transmission. The monochrome copy start button is a button for starting a process for reading a document and immediately forming a monochrome image thereof on a sheet of recording paper. The color copy start button is similarly a button for starting the process of immediately forming a color image of the document. The clear all button is a button for clearing all pieces of input information.

In the present embodiment, even if the preview display mode is changed, the positions where these five areas are arranged are unchanged. It is noted, however, that the sizes of function selecting area 410, preview area 480, action panel area 482 and task trigger area 484 are changed in the lateral direction (longitudinal direction) of display 130 in accordance with the display mode, in order to improve visibility of the preview and to ensure reliable and simple operation.

These five areas are arranged in consideration of the flow line of user's viewpoint and the flow line of user's operation, in addition to the user interface of conventional devices. With such an arrangement, the user's viewpoint moves from upper left to lower right, and the user operation (fingertip of the dominant hand) moves from upper left to lower right, on display 130. This advantageously enables a user-friendly operation.

[Display Layout in Each Display Mode]

In the following, screen image configurations in display modes using the preview will be described. In any of the screen images, the positions where preview area 480, function selecting area 410, action panel area 482 and task trigger area 484 are arranged are basically the same. It is noted, however, that the width (length in the longitudinal direction of display 130) is changed depending on the screen image. Further, as the width changes, elements displayed inside also change. How the transition among these display modes takes place will be described later.

(1) Fit-to-Screen

Figure 6:
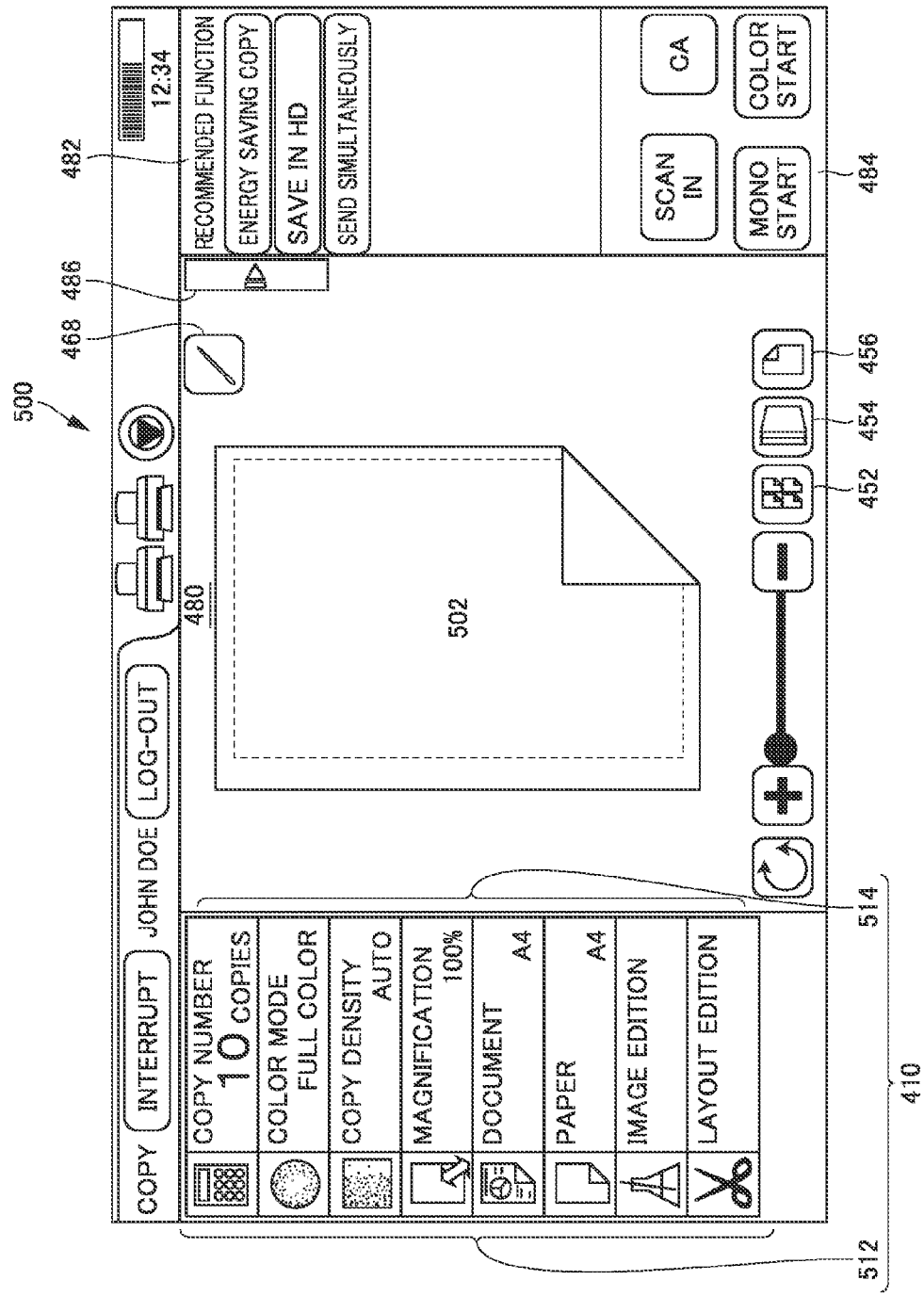
FIG. 6 shows a manner of division of display area in a fit-to-screen display mode of the preview image, in the image forming apparatus.

Referring to FIG. 6, a fit-to-screen screen image 500 is used when a read image is to be displayed at the completion of a scan-in operation. At the center, preview area 480 is arranged. Here, a preview image 502 of a page of a document is displayed in largest possible size in preview area 480. On the left side of preview area 480, function selecting area 410 is arranged. In function selecting area 410, a group of function icons 512, and a group of texts 514 describing functions of respective function icons are displayed. At an upper right side of preview area 480, action panel area 482 is arranged. Task trigger area 484 is arranged therebelow.

When a right end of function selecting area 410 is flicked to the left, function selecting area 410 is displayed in reduced size on the left side of the screen image, and only the group of function icons 512 is displayed. The group of texts 514 is omitted. Even in this state, since the group of function icons 512 for selecting a function is displayed, it is possible for the user to recognize each function. As a result, possibility of use's confusion in selecting a function is low.

When a right end of function selecting area 410 is flicked to the right, function selecting area 410 is drawn out to the right side. Here, the background of function selecting area 410 becomes translucent, and the user can see the image on preview area 480. It is possible to confirm the preview image as a whole when a function is to be selected. Thus, the user can easily select an appropriate function.

Figure 8:
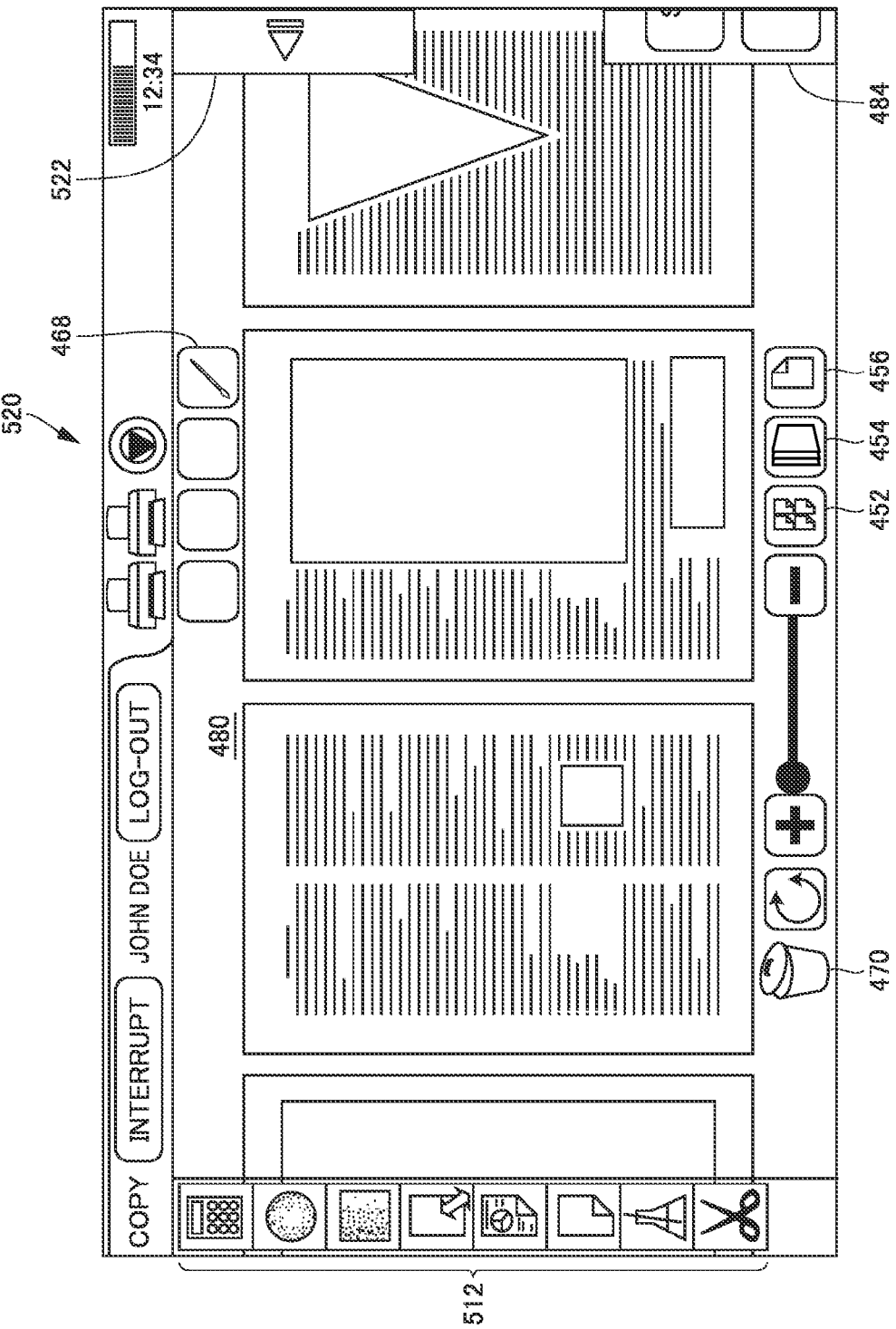
FIG. 8 shows a manner of division of display area in an image edition mode of the preview image, in the image forming apparatus.

When action panel reducing button 486 is pressed, action panel area 482 is reduced to the right side, and an action panel display button 522 shown in FIG. 8 is displayed. When action panel display button 522 is pressed, action panel area 482 is developed and displayed to the left side. The same applies to other screen images.

(2) Finish Preview

Figure 7:
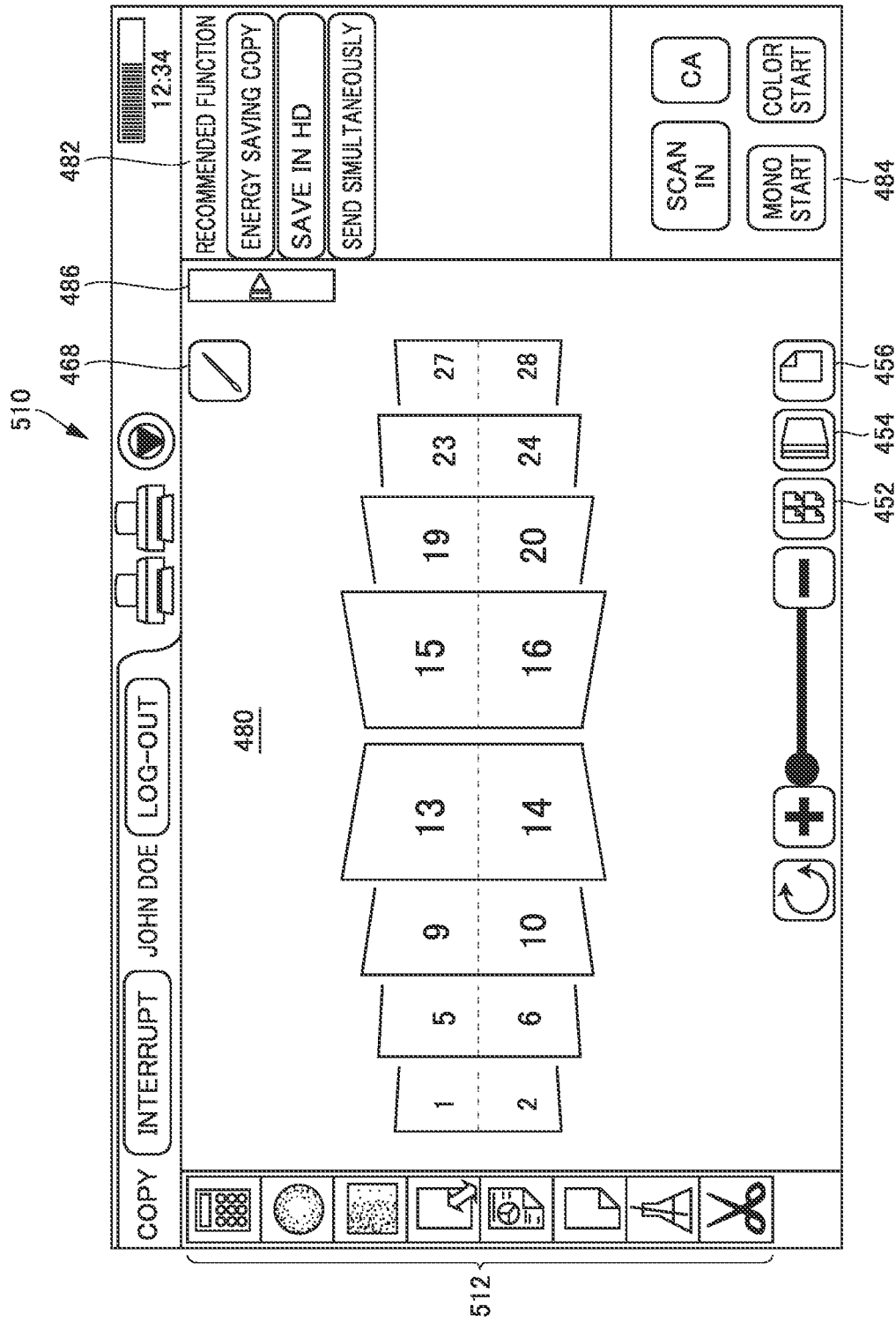
FIG. 7 shows a manner of division of display area in a finish image display mode of the preview image, in the image forming apparatus.

Referring to FIG. 7, on a finish preview screen image 510, function selecting area 410 is displayed in reduced size on the left side. Only the group of function icons 512 is displayed inside function selecting area 410. The group of texts 514 is not displayed. Action panel area 482 and task trigger area 484 are the same as in fit-to-screen screen image 500. The width of preview area 480 is increased corresponding to the reduced width of function selecting area 410. Therefore, when a large number of images are arranged in preview area 480 as in the finished preview, it is easier to grasp the overall configuration. The image arranged on the center is displayed large enough to allow sufficient confirmation of the contents.

In the finish preview, only the group of function icons 512 is displayed and the group of texts 514 is not displayed. When the right end of group of function icons 512 is flicked to the right, however, function selecting area 410 is developed from the group of function icons 512 to the right and displayed. After development, the group of texts 514 is displayed on the right side of the group of function icons 512, and the manner of display is similar to that of fit-to-screen screen image 500. It is noted, however, that function selecting area 410 is translucent. Through function selecting area 410, the image on preview area 480 therebelow can be seen. After the development of function selecting area 410, if a prescribed time period passes without any operation on the function icon or text, function selecting area 410 is again reduced in size, and the display with only the group of function icons 512 is resumed. When the execution of a function selected by the user is completed, function selecting area 410 is reduced, and the display with only the group of function icons 512 is resumed.

(3) Image Edition Mode

In the image edition mode, not only the image display but also processes including insertion of a blank page and erasure of part of the image are possible. Referring to FIG. 8, in an image edition mode screen image 520, similar to finish preview screen image 510, function selecting area 410 is displayed in reduced size on the left side. Only the group of icons 512 is displayed in function selecting area 410. In image edition mode screen image 520, however, different from finish preview screen image 510, action panel area 482 that is displayed in finish preview screen image 510 is folded to the right side and an action panel display button 522 is displayed instead. When action panel display button 522 is pressed, action panel area 482 is developed and displayed. Here again, action panel area 482 is made translucent, and it is possible to confirm the display of preview area 480 therebelow. When a prescribed time period passes without any operation on action panel area 482, action panel area 482 is again folded, and replaced by action panel display button 522. Similarly, when the left end of task trigger area 484 displayed in the reduced size is flicked to the left, task trigger area 484 is enlarged to the normal size. Here, the background of task trigger area 484 is also made translucent. While task trigger area 484 is displayed, buttons in task trigger area 484 can be operated. When a prescribed time period passes without any instruction after the display of task trigger area 484, task trigger area 484 is displayed in the reduced size.

In the image edition mode, task trigger area 484 is also reduced to the right side. Here, only a part of buttons of task trigger area 484 can be seen. In the image edition mode, however, what is given priority is edition of page images and, therefore, reduced display of task trigger area 484 in this manner does not cause any problem.

In the image edition mode, widths of function selecting area 410, action panel area 482 and task trigger area 484 are reduced. Most part of the display area of display 130 can be used as preview area 480. Therefore, edition of images and confirmation of images after edition can be done easily.

In the image edition mode, though reduced in size, action panel display button 522 is displayed on the upper right portion of the screen image in place of action panel area 482 and task trigger area 484 is displayed on the lower right side of the screen image, respectively. Therefore, even during image edition, it is possible for the user to know the positions where these areas exist, and hence, he/she can conduct image edition at ease.

(4) Document Display Mode

Figure 9:
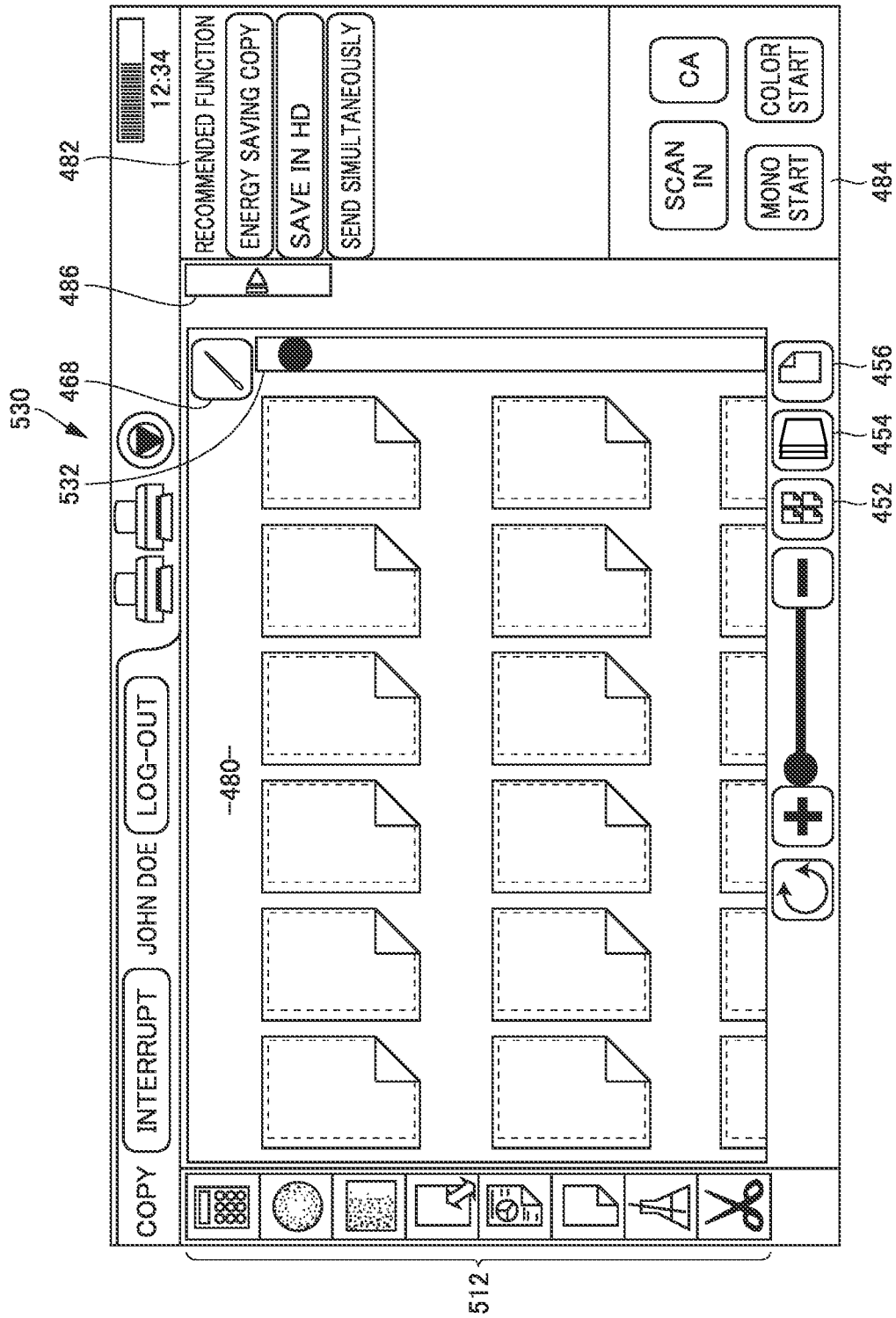
FIG. 9 shows a manner of division of display area in a document display mode of the preview image, in the image forming apparatus.

Referring to FIG. 9, in a document display mode screen image 530, a plurality of read page images are arranged in a matrix on preview area 480. Function selecting area 410 is reduced in size and only the group of function icons 512 is displayed. As in fit-to-screen screen image 500, action panel area 482 and task trigger area 484 are displayed in the normal manner. The size of preview area 480 is larger than in fit-to-screen screen image 500, and a large number of pages can be displayed. In the present embodiment, the plurality of images are arranged in accordance with the width of preview area 480. If the number of images is too large and part of the images cannot be displayed, a scroll bar 532 is displayed on the right end of preview area 480. By operating scroll bar 532, images displayed in preview area 480 can be moved upward/downward. The images can also be moved upward/downward by flicking the screen image upward/downward.

[Screen Image Transition]

Figure 10:
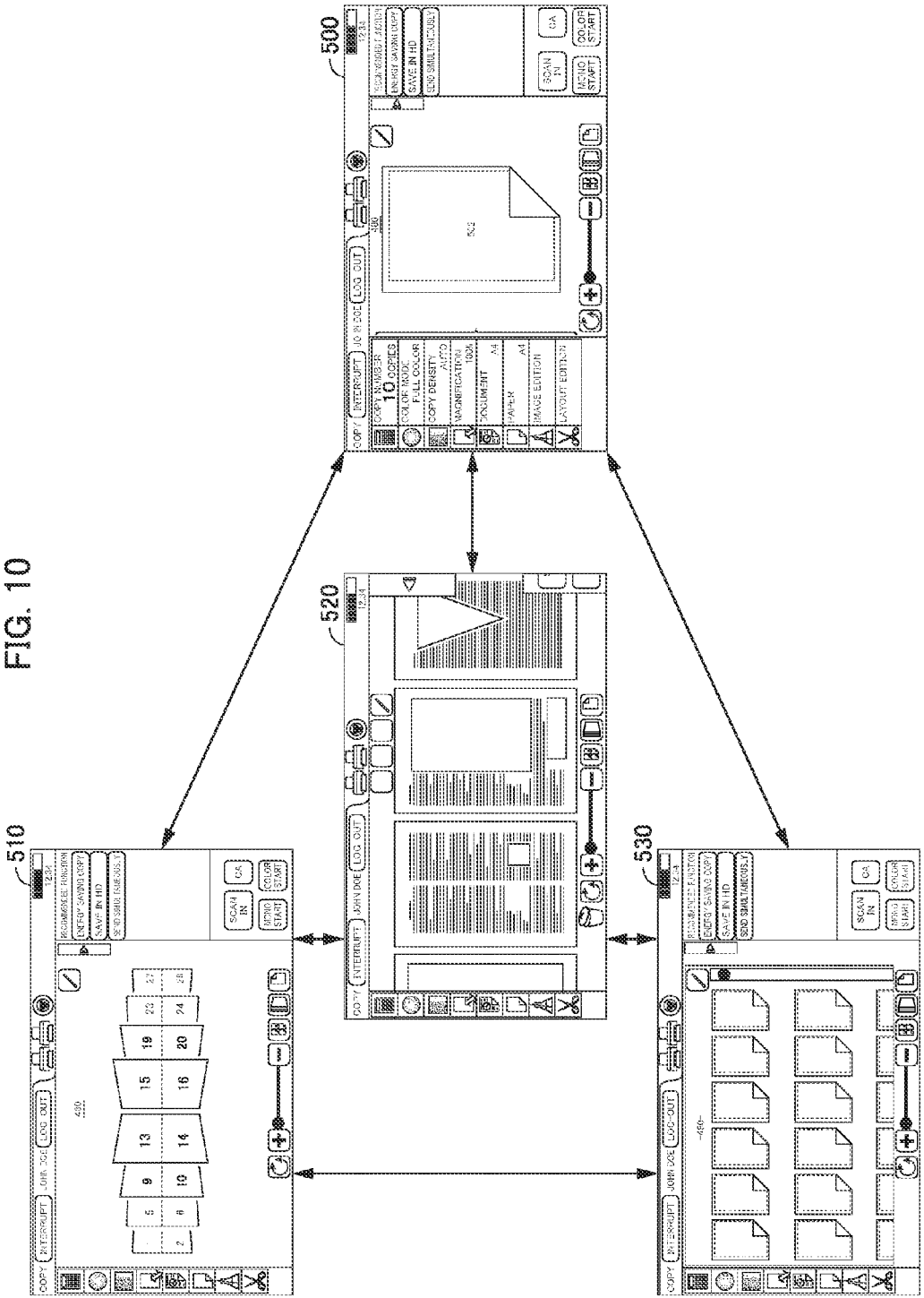
FIG. 10 shows transitions of screen images of the preview display, in the image forming apparatus in accordance with an embodiment of the present invention.

Referring to FIG. 10, it is possible to make a transition from any of fit-to-screen screen image 500, finish preview screen image 510, image edition mode screen image 520 and document display mode screen image 530 to any arbitrary screen image. The transition may be realized by a touch operation of a button displayed on the screen image, or by a gesture operation defined in advance. In the following, the touch operations on buttons will be discussed. Functions similar to the buttons as will be described below can be allocated to gesture operations (arbitrary gestures such as double-tapping, triple-tapping, Z-shaped gesture and V-shaped gesture) that activate the same functions as these buttons.

(1) On any screen image, when fit-to-screen button 456 is touched, a transition to fit-to-screen screen image 500 shown in FIG. 6 occurs. Here, on preview area 480, a preview image of a document page that has been the focus is displayed.

(2) On any screen image, when finish preview button 454 is pressed, a transition to finish preview screen image 510 shown in FIG. 7 occurs. In the finish preview screen image, a document image as processed in accordance with the user setting is generated and displayed on preview area 480. In FIG. 7, a finish preview image when 2-in-1 collection and duplex printing are designated is displayed as an example.

(3) On any screen image, when image edition button 468 is pressed, a transition to image edition mode screen image 520 occurs. In image edition mode screen image 520, buttons for image edition are displayed next to image edition button 468. Further, on a lower left portion of preview area 480, a trash bin icon 470 is displayed. When an image of any page of the document images is drag-and-dropped to trash bin icon 470, the image of the page is deleted from the document.

(4) On any screen image, when document display mode button 452 is pressed, transition of the screen image to document display mode screen image 530 shown in FIG. 9 occurs. The scanned document is displayed in a matrix. When it is impossible to display all pages of the document, scroll bar 532 is displayed.

As is apparent from the screen image transitions, the area ratio of preview area 480 with respect to other areas in fit-to-screen screen image 500 is different from the area ratio of preview area 480 with respect to other areas in finish preview screen image 510, image edition mode screen image 520 or document display mode screen image 530. The latter is larger than the former. That the area ratio is large means it is easier to confirm details of the image. It is unnecessary to increase the reduction ratio even when the number of preview images increases.

On any of finish preview screen image 510, image edition mode screen image 520 and document display mode screen image 530, any of the areas other than preview area 480 is displayed in reduced size. The position where the reduced display appears is such a position where the center of the area is not go out from the inside of the corresponding area displayed in fit-to-screen screen image 500. Here, the "center" refers to a point that corresponds to the center of gravity when the area is regarded as a two-dimensional figure. Even when these areas are displayed in reduced size, the positions are not much different and, therefore, it is unlikely that the user is confused in operation.

In any of the screen images, preview area 480 is arranged at a position where the center point of the screen of display 130 is included. Specifically, preview area 480 is arranged at a position closer to the center of display 130 than other areas. In any screen image, the size of preview area 480 is larger than any other areas. Such an arrangement enables easy confirmation of the preview image.

[Software Configuration]

Figure 11:
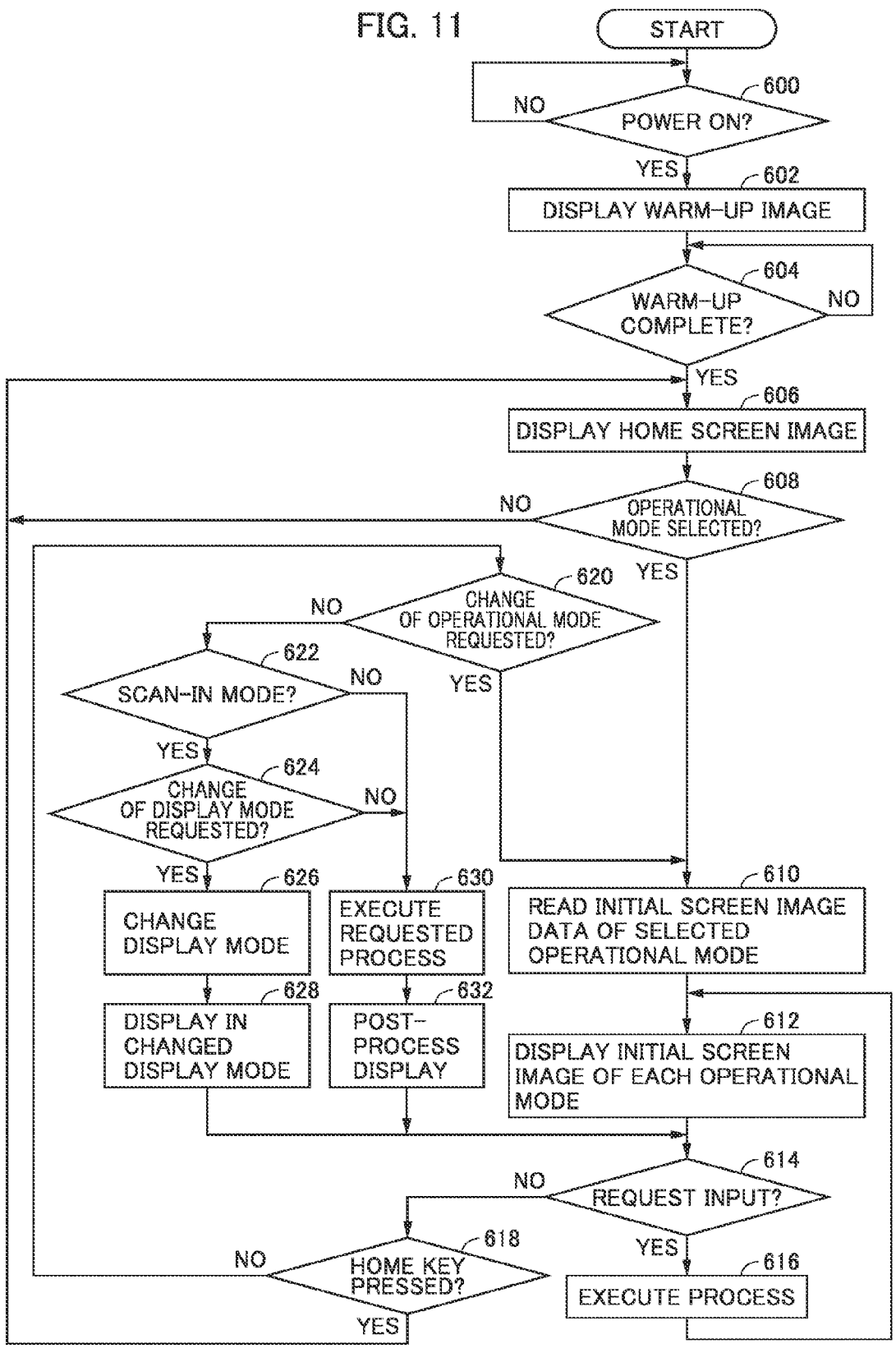
FIG. 11 is a flowchart representing a control structure of a program executed for switching a screen image of the preview display mode, in the image forming apparatus in accordance with an embodiment of the present invention.

Referring to FIG. 11, the control structure of a program executed by CPU 300 of image forming apparatus 100 will be described. CPU 300 of image forming apparatus 100 executes, in parallel with such a program, programs for realizing general functions of an image forming apparatus. These programs, however, are not directly related to the essential portion of the present invention and, therefore, details thereof will not be described here.

Referring to FIG. 11, at step 600, CPU 300 waits until power of image forming apparatus 100 is turned on. When power key 144 is pressed, CPU 300 determines that image forming apparatus 100 is powered on. When powered on, control proceeds to step 602.

At step 602, CPU 300 displays a warm-up screen image on display 130. In parallel therewith, a system check process and a process for supplying electric power to a heater to increase the temperature of heating roller 248 are executed. Thereafter, at step 604, CPU 300 waits until warm-up is completed. When warm-up is completed, control proceeds to step 606.

At step 606, CPU 300 waits for a user to log-in, and then displays the home screen image on display 130. Thereafter, at step 608, CPU 300 determines whether or not any operational mode is selected. The operational mode is selected, by way of example, by operating an icon displayed on the home screen image. When an operational mode is selected (determination at step 608 is positive), control proceeds to step 610. Otherwise, control returns to step 606.

At step 610, CPU 300 reads the initial screen image data of the selected operational mode from HDD 302. At step 612, the initial screen image is displayed on display 130. Thereafter, though not shown, if a prescribed time period passes without selection of any process, for example, the control returns to step 606.

After step 612, at step 614, CPU 300 determines whether or not any request has been input by the user. If the result is positive, control proceeds to step 616. Otherwise, control proceeds to step 618.

At step 616, CPU 300 executes the process requested by the user, using various functional units of image forming apparatus 100. Thereafter, control returns to step 612.

If the result of determination at step 614 is negative, at step 618, CPU 300 determines whether or not home key 148 is pressed. If the result is positive, control returns to step 606. Otherwise, control proceeds to step 620.

At step 620, whether or not a request for changing the operational mode has been made by the user is determined. If the determination is positive, the flow proceeds to step 610, and the initial screen image data of the new operational mode is read in accordance with the change request, and the data is displayed on display 130 at step 612. If the result is negative, control proceeds to step 622.

At step 622, whether the current operational mode is the scan-in mode in copy mode, FAX transmission mode, and image filing mode is determined. If the result is positive, control proceeds to step 624, and otherwise, control returns to step 630.

At step 624, whether or not a request for changing the display mode has been made by the user is determined. Specifically, whether or not any of document display mode button 452, finish preview button 454, fit-to-screen button 456 and image edition button 468 shown in FIGS. 6 to 9 has been pressed, or any of the gesture operations having the same functions allocated has been made, is determined. If the result is positive, control proceeds to step 626, and otherwise, control proceeds to step 630.

If the result at step 624 is positive, at step 626, the display mode as the changed destination is determined. Depending on which button is pressed or what gesture is made, the screen image as the changed-in screen image is determined, as shown in FIG. 10. Thereafter, in accordance with the determined screen image, at step 628, the display screen image is updated. After step 628, control returns to step 614.

If the determination at step 624 is negative, at step 630, the process requested by the user is executed, and at step 632, depending on the processed result, the screen image in accordance with the present operational mode and display mode is displayed. Then, control returns to step 614.

The request input by the user at step 616 may include pre-printing requests, not involving the actual printing by image forming apparatus 100, such as the change of display mode in function selecting area 410, setting of a function or functions in function selecting area 410, and the change of the preview display manner in preview area 480. If such pre-printing request is made, the request is executed at step 616, and thereafter, the process returns to step 612 to wait for an input of further request (eventually, a print request).

[Operation]

Image forming apparatus 100 operates in the following manner. In the following description, mainly FIG. 11 will be referred to.

—Home Screen Image Displaying Operation—

The user presses power key 144 (FIGS. 1 and 3) of image forming apparatus 100. The determination at step 600 becomes positive. Image forming apparatus 100 starts warming-up. Until the warming-up is complete, a warm-up screen image is displayed on display 130 (step 602). As the warm-up screen image, information that can be displayed even when image forming apparatus 100 is under system check is preferably displayed on display 130.

When the warm-up is complete and the user logs in, home screen image 330 shown in FIG. 4 is displayed on display 130 (step 606). The preview display is also executed in copy mode, mail mode, FAX mode and document filing mode. In any of these modes, the operation of image forming apparatus 100 related to the preview display is the same. Therefore, in the following, only the operation of image forming apparatus 100 in the copy mode will be described.

When the copy mode is to be selected, the user operates an icon 372 on the home screen image shown in FIG. 4. In the present embodiment, when icon 372 is touched, tapped or double-tapped, it is determined that the copy mode is selected (step 608). CPU 300 reads the data of copy initial screen image data from HDD 302 or the like (step 610). Using the data, the initial screen image of copy mode is displayed on display 130 (step 612). Here, what is displayed on display 130 is the copy mode initial screen image shown in FIG. 5. Since no image has been read, nothing is shown in the preview area 480.

There are mainly three types of operations (tasks) that may be selected by the user here. The first is a task of directly making a black-and-white (monochrome) copy. The second is a task of directly making a color copy. The third is a task of scan-in operation, in which a document image is read and stored in image forming apparatus 100 for a copy. Any of these tasks can be started by pressing an appropriate button as a UI (User Interface) element displayed in task trigger area 484. The first and second tasks are substantially the same processes as those performed in a conventional copy machine. The preview display is given in the third, scan-in process. Therefore, only the operation of image forming apparatus 100 when the scan-in operation is executed will be described here. In the following, an operation of image forming apparatus 100 when a document containing a plurality of pages is copied by image forming apparatus 100 will be described as a representative example.

Figure 12:
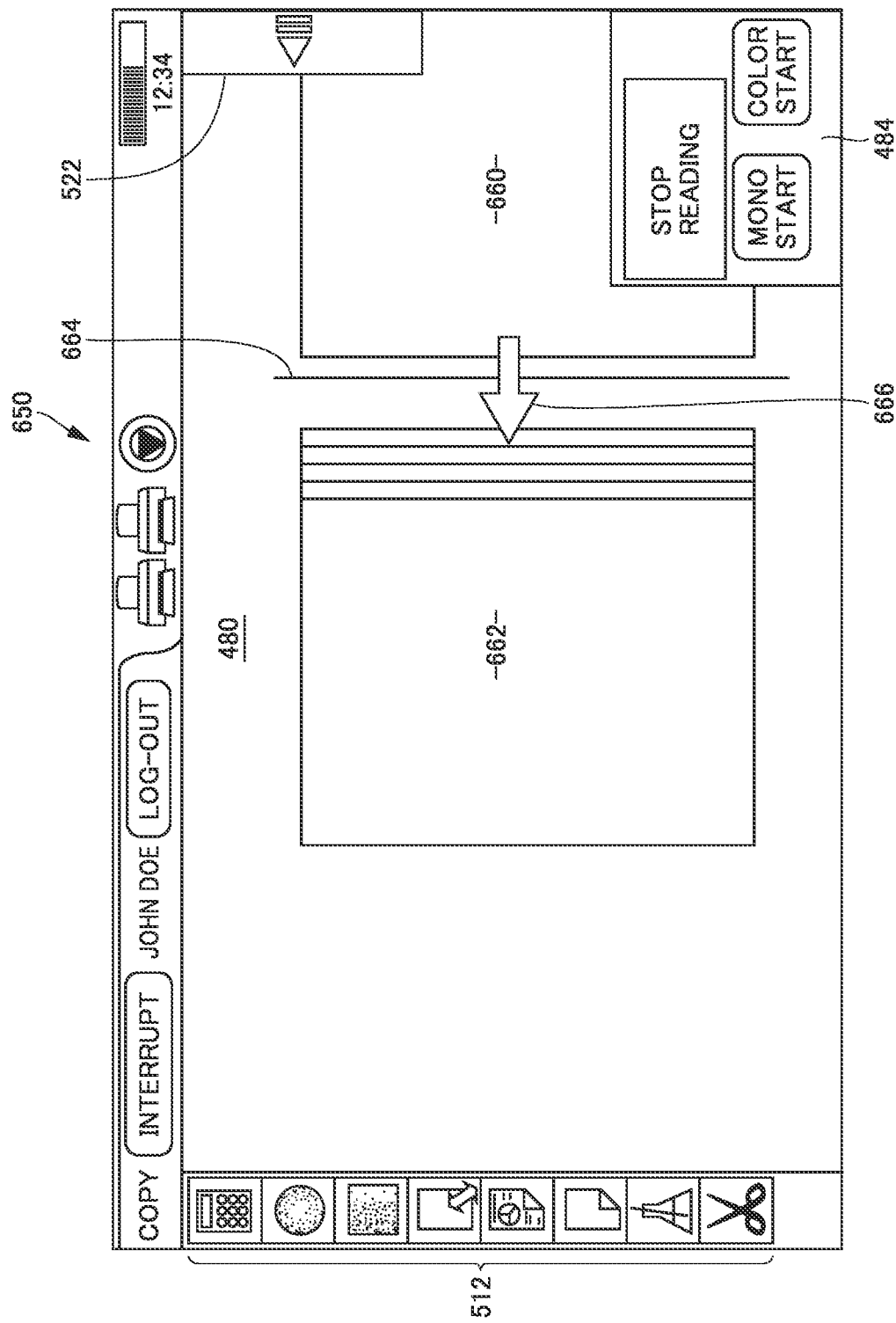
FIG. 12 illustrates the screen image display when a document is read, in the image forming apparatus in accordance with an embodiment of the present invention.

When the scan-in button is pressed, the determination at step 614 becomes positive. At step 616, reading of the document using document reading unit 102 and storage in HDD 302 are executed. Then, control returns to step 612. Referring to FIG. 12, at the time of document reading, a screen image 650 is displayed on display 130. On screen image 650, on the right side area of a line 664, an image 660 based on the image data that is being read is displayed, and on the left side of line 664, an image 662 based on the image data that has been already read and stored in HDD 302 is displayed. Specifically, as indicated by an arrow 666, the plurality of pages of the document are stored in the order of reading in HDD 302. Further, in task trigger area 484 of screen image 650, in place of "SCAN IN" button and all clear button (CA), a read stop button requesting suspension of document reading is displayed. Further, in place of action panel area 482, an action panel display button 522 for displaying action panel area 482 is displayed. When action panel display button 522 is pressed by the user, action panel area 482 is displayed.

When reading of all pages of the document ends, the screen image is changed to fit-to-screen screen image 500, and the first page of the read image is displayed on preview area 480 (step 612).

When reading ends, the user performs various settings using function selecting area 410, while viewing the image displayed in preview area 480 (the path through steps 614, 618, 620, 622, 624 and 630). When setting is completed, an image updated in accordance with the results is displayed in preview area 480 (step 632).

When the display mode related to the preview display is changed, image forming apparatus 100 operates in the following manner. In the preview display, no matter whether it is fit-to-screen screen image 500, finish preview screen image 510, image edition mode screen image 520 or document display mode screen image 530, control can be moved to a desired screen image by pressing document display mode button 452, finish preview button 454, fit-to-screen button 456 and image edition button 468. In the following, for easier understanding, an operation of image forming apparatus 100 when the display mode is changed from fit-to-screen screen image 500 to each of the screen images mentioned above will be de described.

When the user wishes to check the finish preview of the document, he/she presses finish preview button 454. Then, the screen image on display 130 is changed to finish preview screen image 510 shown in FIG. 7 (the path through steps 614, 618, 620, 622, 624, 626 and 628; hereinafter, when the display mode is changed, control proceeds through the same path). In finish preview screen image 510, function selecting area 410 is reduced and only the group of function icons 512 is displayed. Preview area 480 is widened, and the user can easily confirm the finish preview to see whether the number of documents are finished in accordance with the various settings.

When the user wishes to confirm alignment sequence of the document pages, he/she presses document display mode button 452. Then, the screen image is changed to document display mode screen image 530 in FIG. 9. Function selecting area 410 is reduced and preview area 480 is widened. Images of the plurality of document pages are arranged in a matrix and displayed as a preview in preview area 480. When the number of pages of the document is large, scroll bar 532 is displayed on the right end of preview area 480. By using scroll bar 532, the display in preview area 480 can be scrolled, and hence, all document images can be confirmed.

When edition of the document is desired, the user presses image edition button 468. The screen image is changed to image edition mode screen image 520 in FIG. 8. In image edition mode screen image 520, a button for image edition and trash bin icon 470 for deleting an arbitrary document image are newly displayed. In image edition mode screen image 520, function selecting area 410 is reduced and only the group of function icons 512 is displayed. Action panel area 482 is also reduced, and only action panel display button 522 is displayed. Task trigger area 484 is reduced to the right end side of the screen image. The size of preview area 480 is larger than any other screen images. It is possible for the user to confirm fine details of the image and to carry out image edition of the document images.

Document edition includes two types of editions, that is, edition of each page and edition of a plurality of pages. In the present embodiment, the former will be referred to as image edition and the latter is referred to as layout edition. The image edition includes image frame erasure, addition of texts, embedding of watermark, and addition of a user stamp. The layout edition includes page collection of collecting a plurality of pages to one page, setting of margin for a plurality of pages, and movement of pages. The image edition and layout edition can be called by operating the edition button displayed on preview area 480, or by operating icons displayed in the group of function icons 512. When a document image is drag-and-dropped to trash bin icon 470, the page can be deleted. Movement of pages is realized by drag-and-dropping a page to be moved to a desired position.

In fit-to-screen screen image 500 of FIG. 6, finish preview screen image 510 of FIG. 7, and document display mode screen image 530 of FIG. 9, action panel area 482 is displayed. On action panel area 482, pieces of information related to assistance, guidance and suggestion related to the copy operation are displayed. By way of example, on action panel area 482, functions effective in the operational mode selected by the user are displayed. The displayed items themselves are the software buttons. When the user operates a desired item among the items displayed in action panel area 482, the corresponding function is activated.

In image edition mode screen image 520 of FIG. 8, action panel area 482 is not displayed. When action panel display button 522 is operated, action panel area 482 is spread over preview area 480, and display similar to other display screen images is provided. It is noted, however, that the background of action panel area 482 is translucent. Therefore, it is possible to confirm the document displayed in preview area 480 through action panel area 482. If a prescribed time period passes without any operation after action panel area 482 is displayed, or if a user makes an operation unrelated to action panel area 482, action panel area 482 is again reduced and replaced by action panel display button 522.

As described above, in the processes using the preview display, the screen image is roughly divided into five areas. In accordance with the process to be performed by the user, preview area 480 may be enlarged or other areas may be enlarged. By way of example, when transition from fit-to-screen screen image 500 to finish preview screen image 510 and document display mode screen image 530 is to be made, function selecting area 410 is reduced. As a result, the size of preview area 480 is enlarged. As preview area 480 is enlarged, it becomes easier to confirm fine details of the preview image or to confirm details of a large number of document pages previewed at one time. Here, action panel area 482 and task trigger area 484 are displayed in the same manner as before. Therefore, it is possible to immediately select a desired operation while confirming the preview image, and good operability is ensured.

When display mode transition to image edition mode screen image 520 takes place, action panel area 482 and task trigger area 484 are reduced in size, in addition to function selection area 410. Since the size of preview area 480 can be made as large as possible, it is possible to edit the image while checking fine details of the image. Here again, function selecting area 410, action panel area 482 and task trigger area 484 are displayed reduced to the end portions of the screen image. If it becomes necessary to select any function, an operation of enlarging these areas and selecting the function can easily be done.

Even a user not familiar to the operations can make a change to a screen image that is easy to operate (fit-to-screen screen image 500, finish preview screen image 510 or document display mode screen image 530) by pressing the button for changing the display mode. Therefore, it is possible to reliably and easily confirm the image by the preview image and to easily operate the image.

In the embodiment above, the screen image is mainly divided into five areas. The present invention, however, is not limited to such an embodiment. What is essential is that the screen image is divided to the preview area and at least one other area. In accordance with the display mode, the display of area or areas other than the preview area is switched between the normal size and the reduced size, and the remaining area is used as the preview area. By way of example, an embodiment may be possible in which the screen image is divided into three areas along the longitudinal direction, and the central area is used as the preview area. In that case, the areas other than the preview area may be switched between the normal size and the reduced size. Though it is unnecessary to reduce both areas simultaneously, it is desired to reduce the size of both areas simultaneously if the size of preview area is to be maximized. It is desirable that these areas are arranged along the longitudinal direction of the touch-panel. The arrangements in the left/right direction and the up/down direction are not limited to the one shown in FIG. 5. The arrangement of these areas may be customized to allow easier operation by the user. System area 400 may be positioned at the bottom.

In the embodiment above, the background of function selecting area 410, action panel area 482 and the like is made translucent once these areas are displayed in reduced size and thereafter enlarged by, for example, a flick operation. The present invention, however, is not limited to such an embodiment. The background may be non-transparent.

Further, in the embodiment above, display 130 that allows both the touch operation and gesture operation is used. The present invention, however, is not limited to such an embodiment. The apparatus may have a display allowing only the touch operation. In that case, a special button may be displayed for enlarging function selecting area 410 that has been reduced in size.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A display console, comprising:
a display device having an image displaying function; and
a dividing unit for controlling said display device to divide a display screen of said display device into an image preview area and another area; wherein
said dividing unit includes
a switching unit switching, in accordance with a user instruction, between a first display mode in which area ratio between said preview area and said another area has a first value and a second display mode in which size of said another area is made smaller and size of said preview area is made larger than in said first display mode;
said another area includes
a task trigger area in which an element instructing execution of a prescribed task on document data having its preview image displayed is arranged, and
a function selecting area in which an element for selecting a function of setting one or both of data conversion and condition for executing said task, on the document data having its preview image displayed, is arranged; and
said dividing unit includes
a reducing unit displaying, in accordance with a user instruction, at least said function selecting area in reduced size in said second display mode,
a changing unit changing said function selecting area between a size in said first display mode and a size in said second display mode in accordance with a user operation of switching said first display mode and said second display mode,
a text display unit for displaying functions of said function selecting area in said first display mode in text, and
an icon display unit for displaying functions of said function selecting area with icons, with the text display of each function erased, in said second display mode.

2. The display console according to claim 1, wherein
said display device displays said functions with icons, in addition to the display of said functions in text, in said first mode.

3. The display console according to claim 2, wherein
said dividing unit further includes an automatic switching unit for switching to said second display mode when a prescribed time period passes without any operation on said function selecting area.

4. The display console according to claim 1, wherein
said dividing unit further includes an automatic switching unit for switching to said second display mode when a prescribed time period passes without any operation on said function selecting area.

\* \* \* \* \*